United States Patent [19]

Schneider et al.

[11] 4,148,975
[45] Apr. 10, 1979

[54] LITHIUM IODINE PRIMARY CELLS HAVING NOVEL PELLETIZED DEPOLARIZER

[75] Inventors: Alan A. Schneider, Reisterstown; George C. Bowser, Glyndon; Lurman H. Foxwell, Baltimore, all of Md.

[73] Assignee: Catalyst Research Corporation, Baltimore, Md.

[21] Appl. No.: 892,655

[22] Filed: Apr. 3, 1978

[51] Int. Cl.$^2$ .................... H01M 4/08; H01M 6/00
[52] U.S. Cl. ..................... 429/174; 429/213; 429/218; 252/426
[58] Field of Search ............... 429/174, 192, 199, 213, 429/218; 252/426, 425.3

[56] References Cited

U.S. PATENT DOCUMENTS

| 3,438,813 | 4/1969 | Davis | 429/213 |
| 3,660,163 | 5/1972 | Moser | 429/213 X |
| 3,660,164 | 5/1972 | Hermann et al. | 429/213 X |
| 3,674,562 | 7/1972 | Schneider et al. | 429/213 X |

*Primary Examiner*—Anthony Skapars
*Attorney, Agent, or Firm*—Reed, Smith, Shaw & McClay

[57] ABSTRACT

An improved lithium iodine battery, depolarizer therefor and method of making same in which the depolarizer comprises a pelletized particulate mixture of iodine, an organic polymer of either poly-2-vinylpyridine or poly-2-vinylquinoline and a charge transfer complex consisting of the selected organic polymer and iodine wherein the mixture contains from 3 to 30 parts of iodine for each part of total organic.

10 Claims, 2 Drawing Figures

LITHIUM IODINE PRIMARY CELLS HAVING NOVEL PELLETIZED DEPOLARIZER

FIELD OF THE INVENTION

The present invention relates to an improved lithium halide primary cell, a depolarizer therefor and a method for making same. In particular, the invention is directed to lithium iodine cells in which the depolarizer or cathode material is a pelletized particulate mixture of an organic polymer consisting of poly-2-vinylpyridine (P2VP) or poly-2-vinylquinoline (P2VQ) iodine and a charge transfer complex of said organic polymer and iodine. The depolarizers are hereinafter collectively referred to as $P2VP + P2VP.n_1I_2 + n_2I_2$ were $n_1 > 0$ and $n_1 + n_2 = 3$ to 30.

BACKGROUND OF THE INVENTION

The present invention provides a lithium halide primary cell having a shelf life extendable to more than ten years by utilizing a pelletized depolarizer consisting of $P2VP + P2VP.n_1 + n_2I_2$ wherein $n_1 > 0$ and $n_1 + n_2$ is equal to 3 to 30 (parts of $I_2$ for each part of total organic). Preferably $n_1n_2$ is equal to 15 to 26 parts of $I_2$ for each part of organic in the depolarizer. The cells of the present invention are particularly useful in electric watch, calculator and heart pacer applications.

U.S. Pat. Nos. 3,660,163 and 3,674,562 disclose batteries utilizing charge transfer complexes which are mixed with excess amounts of iodine. In particular, U.S. Pat. No. 3,674,562 teaches a novel cathode material which is "plastic" that is a pliable, putty-like solid. This material when used as a cathode in lithium primary cells has a low internal impedance and a relatively low self-discharge as measured by its heat of discharge. Cells manufactured in accordance with U.S. Pat. No. 3,674,562 are especially well suited for use in long-life, low current drains applications such as heart pacers.

What has been found is that 3–30 parts of iodine can be mixed with each part of the polymer P2VP or P2VQ having a weight average molecular weight* of above about $1 \times 10^3$ and pelletized without becoming plastic. Unlike the "plastic" depolarizer, $P2VP.nI_2$ and $P2VQ.nI_2$, material of U.S. Pat. No. 3,674,562, the pelletized $P2VP + P2VP.n_1I_2 + n_2I_2$ (where $n_1 + n_2 = 3$ to 30) depolarizer of the present invention has initially unacceptable electrical characteristics for battery applications. Typically, the initial impedance of a cell manufactured with the pelletized depolarizer of the present invention is quite high, for example, impedances from 2,000 ohms to 20,000 ohms are experienced. This compares with initial impedances of cells made with the material disclosed in U.S. Pat. No. 3,674,562 which have impedances in the range of about 30 to 300 ohms.

* $\overline{Mw} = \Sigma NiMi^2 / \Sigma NiMi = \Sigma WiMi$

It was found, however, that initial impedances greatly diminish with time so that the cell "acquires" the appropriate electrical characteristics for battery applications. In fact, cells made in accordance with the present invention result, after significant discharge, in impedances less than those made from the plastic depolarizer. In certain instances, the internal impedance in batteries of the present invention was less by a factor of five than those made with plastic depolarizers.

Generally, it has been well known to use various charge transfer materials, including P2VP and P2VQ, for complexing with halides, normally iodine, for use as depolarizers. Also, it has been equally well known that such materials could be pelletized for use in primary cells, U.S. Pat. Nos. 3,438,813 and 3,660,164. The depolarizer is each instance was in the form of a complex wherein the halogen comprises from 50 to 71% by weight of the complex. Cells produced in this manner had relatively short operating lives. Another proposed approach has been to utilize substantially pure iodine pellets having an additive of an electrically conductive material therein to which a coating of polyvinyl pyridine iodine is applied to the outer surface. U.S. Pat. No. 3,937,635. Typically, high portions of uncomplexed iodine increased the internal cell resistance. Pelletized cells having a charge transfer complex mixed with iodine in a ratio of 3 to 10 were found to have useful electrical properties. U.S. Pat. No. 3,660,163. The advantages of the greater iodine content, however, were achieved by forming the complex and iodine in the plastic state. See also U.S. Pat. No. 3,674,562.

It is, accordingly, an object of the present invention to provide a lithium halide battery in which the depolarizer is a pelletized particulate and comprises either $P2VP + P2VP.n_1I_2 + n_2I_2$ or $P2VQ + P2VQ.n_1I_2 + n_2I_2$ where $n_1 > 0$ and $n_1 + n_2 = 3$ to 30. The batteries made in accordance with the present invention have significant advantages over prior art batteries. These advantages will become apparent from a perusal of the following description of the invention taken in connection with the accompanying drawings.

DESCRIPTION OF THE INVENTION

Figure 1:
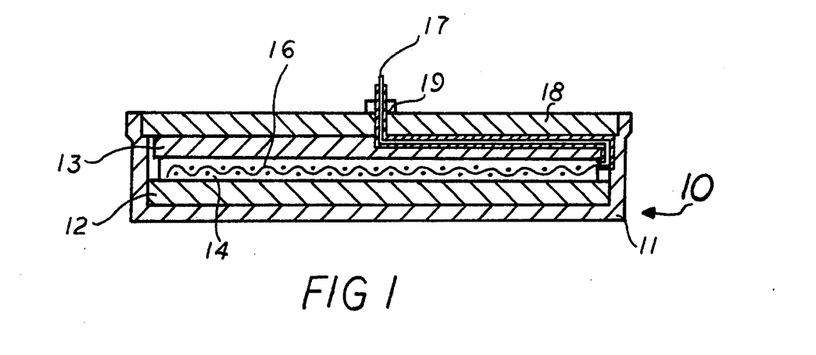
FIG. 1 is a sectional elevation taken along line I—I of FIG. 2 of a battery utilizing the disc depolarizer of the present invention.
Figure 2:
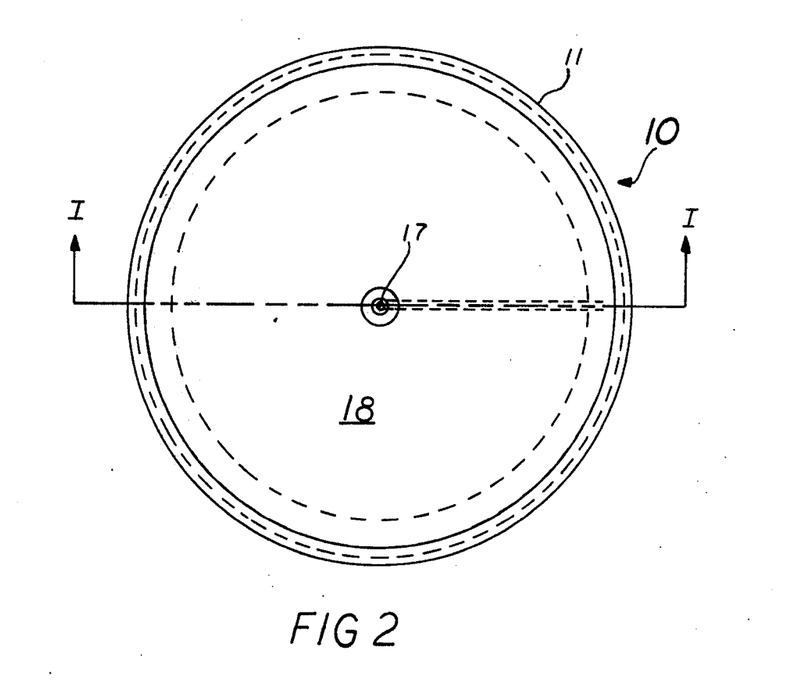
FIG. 2 is a plan view of the battery shown in FIG. 1.

Referring to FIGS. 1 and 2, battery 10 of the present invention comprises an outer casement member 11, preferably made from stainless steel and shaped in the form of a cup to facilitate assembly. A pair of lithium anode discs 12 and 13 are positioned in member 11 with a disc 14 of pelletized depolarizer interposed between discs 12 and 13. Preferably, lithium discs 12 and 13 are of a configuration substantially conforming to the inner configuration of encasement member 11 to achieve a tight fit for electrical contact. Depolarizer disc 14 is dimension slightly smaller than the lithium anode discs to avoid electrical contact with encasement member 11.

Depolarizer disc 14 preferably includes a cathode current collector comprising a metal screen 16 made, for example, of nickel and having cathode lead 17 electrically connected thereto. Lead 17 is sheathed in an insulating material such as Halar ® and is routed over lithium disc 13 to the center thereof. A top member 18 having opening 19 in its center is hermetically bonded to encasement 11. Lead 17 is positioned through opening 19 and sealed therethrough as the positive terminal.

It is clear that battery 10 may be otherwise embodied by using only one lithium disc or by isolating the lithium disc from case 11 and placing pellet 14 in contact therewith. In the latter case, electrical lead 17 would be connected to the lithium anode. Also, both the anode and depolarizer pellet 14 can be insulated from case 11 to form a bipolar battery requiring two electrical leads.

It has been discovered that pelletization of the organic polymer P2VP or P2VQ and $I_2$ results in a novel depolarizer that can be used in lithium halide primary cell 10. The material, $P2VP + P2VP.n_1I_1 + n_2I_2$, greatly facilitates the manufacture of cells by permitting the use of automatic handling equipment. More importantly, the electrical characteristic of the depolarizer provide certain advantages over a depolarizer consisting of plastic $P2VP.nI_2$ or $P2VQ.nI_2$. A battery utilizing pelletized particulate $P2VP+P2VP.n_1I_2+n_2I_2$ will exhibit electrical characteristics quite different from batteries prepared in accordance with U.S. Pat. No. 3,674,562. Batteries prepared in accordance with the present invention have an open circuit voltage of about 2.8v (the same as conventional batteries), but the internal impedance of the batteries is quite high. Although the initial impedance of the pellet is unsuitably high, it was unexpectedly found that the initial impedance naturally decreases at a very fast rate. For example, decreases of between 50 to 60% during the first week are normal. Also, by gently warming the cells ($<100°$ C.), decreases in the impedance can be greatly accelerated. These decreases in internal impedance increase the voltage delivered by a battery under load. This increase typically continues until the decrease in internal impedance ends.

Another impedance factor associated with a battery using the pelletized depolarizer of the invention relates to the electrolyte. When such a battery is under load, the thickness of that component, lithium iodide, increases and consequently the impedance of that component of battery increases. Thus, as the battery is discharged, the total battery impedance will decrease as the pellet impedance decreases and will begin to increase as the increasing $LiI_2$ becomes the dominating factor.

It was originally thought that the noted characteristics were due to a transformation of the pellet into the "plastic" state in U.S. Pat. No. 3,674,562. However, it has been found that such is not the case; the pelletized depolarizer remains in substantially its initial form. It is presently believed these characteristics are associated with the formation of the electrolyte layer ($LiI_2$) in the pelletized $P2VP+P2VP.n_1I_2+n_2I_2$ which has a large number of grain boundaries that promote ion migration. Also, mechanical defects are formed in the lithium halide electrolyte layer which provide channels for ion migration. In conventional cells, including those of the prior art which utilized pelletized cathode materials, impurities were added to create crystal defects in the lithium iodide layer. For example, it has been common practice to add impurities such as divalent ions (aluminum oxide and silicon dioxide are common examples) or waters of hydration.

In the present invention, no impurities are added. Defects are believed to form in the crystaline structure of the electrolyte which provide broader channels for ionic flow. The evidence indicates that the morphology of the depolarizer governs to a great extent the morphology of the lithium iodide layer. In prior $P2VP.nI_2$ or $P2VQ.nI_2$ cells the plastic state permitted a relatively perfect layer to form causing large regular crystals. The pelletized depolarizer, on the other hand, promotes a cracked layer in which crystal defects or disorders occur because of the mechanical arrangement of the physical structure of the depolarizer materials. Whatever the physical-mechanical reason, the pelletization of the $P2VP+P2VP.n_1I_2+n_2I_2$ has resulted in cells having greater power density than those which utilized such material in the plastic state.

Additionally, the mechanical defects which promote ion migration also permit iodine vapor diffusion which results in self-discharge properties of the cells. For commercial purposes it is possible to trade higher self-discharge for reducing the internal impedance for reducing electrical data scatter. The preferred iodine ratio is from 18 to 26 parts of iodine for each part of organic (both complexed and uncomplexed). Higher iodine ratios reduce cracking (lower grain boundaries) and cause the formation of larger, more perfect crystals. The higher iodine ratios result in lower self-discharge, but never as low as that achieved by plastic depolarizer materials. The low iodine ratios e.g., 5:1 to 8:1, promote less perfect crystals and higher self-discharge. Cells constructed with these lower ratios have a high power density which makes them useful in short lived applications such as hearing aids. Accordingly, in the preferred range of iodine, the end of life characteristics can be extended.

In manufacturing depolarizer pellets, the iodine is ground in a ball mill into a particulate having a size of less than $-70$ mesh and the polymer is ground to a size of less than $-100$ mesh and preferably $-150$ to $-200$ mesh. It has been found that the particle size of the polymer and iodine as well as the molecular weight of the polymer and pellet density influence the initial cell impedance and the time necessary for the cell to reach full activation. The smaller the particle size, the lower the cell impedance with the size of the polymer having a greater effect than size of the iodine.

The particulate iodine and polymer are mixed together in the preferred ratio of 18 to 26 parts of iodine to one part of polymer. The mixture is placed in a die of the desired configuration and formed into a pellet with a pressure of from about 5,000 to 15,000 psi. Unlike prior pelletized depolarizers which used stoichemetric amounts of iodine, the pellets of $P2VP+P2VP.n_1I_2+n_2I_2$ are not brittle. They retain their original shape, but have a slight tackiness for electrical contact.

By modifying the method set forth in U.S. Pat. No. 3,674,562, the same amount of polymerization initiator (n-butyl-lithium) is used, but it must be added much slower to allow the formation of longer polymer chains or by forming polymerization at a lower temperature. Otherwise a low molecular weight polymer is obtained which when mixed with iodine becomes plastic as disclosed in that patent. The precipitate is vacuum dried and ground as above. The increased polymer length permits mixing with the iodine without plasticity and subsequent pelletization of the mixture. Commercially pure grades of P2VP are useful in the present invention and do not result in a plastic depolarizer inasmuch as they normally have a molecular weight of from 6,000 to 13,000.

As mentioned above, the initial impedance (representative of depolarizer impedance) of a battery having the plastic depolarizer of U.S. Pat. No. 3,674,562 is much lower than batteries having the pelletized depolarizer of the present invention. However, the slope of the curve representative of impedance as a function of time (electrolyte layer) is less in the batteries of the present invention and intersect those curves of the batteries with plastic depolarizer within a relatively short time. Accordingly, batteries having the pelletized depolarizers of the present invention have significantly better end of life characteristics than prior plastic depolarizer cells having an equivalent amount of iodine. In batteries of the present invention, increasing the iodine ratio from 15:1 to 26:1 increases the end of life from 3 years to 10 or more years.

The following tables (A and B) compare a lithium anode enclosed battery made with the depolarizer of U.S. Pat. No. 3,674,562 (A) with similar battery made with the pelletized depolarizer of the present invention (B). Both batteries consisted of 15 to 1 by weight ratio of iodine to P2VP and both exhibited an open circuit voltage of 2.8 volts. The test were conducted at 37° C.

TABLE A

| DATE YR DAY | ELAPSED TIME (Mos.) UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 76 317 | 0.0 | 2807.8 | 27 | 2803 | 2705 | 37 | 9999K | 0 | |
| 76 318 | 0.0 | 2807.4 | 28 | 2803 | 2702 | 38 | 1000K | 0 | |
| 76 321 | 0.1 | 2807.4 | 30 | 3803 | 2693 | 42 | 1000K | 0 | |
| 76 322 | 0.1 | 2807.0 | 31 | 2802 | 2686 | 44 | 1000K | 0 | |
| 76 323 | 0.2 | 2807.2 | 32 | 2802 | 2680 | 46 | 1000K | 0 | |
| 76 324 | 0.2 | 2807.2 | 34 | 2802 | 2673 | 49 | 1000K | 0 | |
| 76 325 | 0.2 | 2807.2 | 36 | 2801 | 2662 | 53 | 1000K | 0 | |
| 76 329 | 0.4 | 2806.9 | 42 | 2800 | 2634 | 64 | 1000K | 1 | |
| 76 336 | 0.6 | 2806.5 | 59 | 2797 | 2574 | 88 | 1000K | 1 | |
| 76 343 | 0.8 | 2806.2 | 85 | 2793 | 2494 | 123 | 1000K | 2 | |
| 76 348 | 1.0 | 2805.8 | 112 | 2789 | 2421 | 155 | 1000K | 2 | |
| 76 350 | 1.1 | 2805.7 | 129 | 2786 | 2371 | 179 | 1000K | 2 | |
| 76 357 | 1.3 | 2805.0 | 168 | 2780 | 2282 | 224 | 1000K | 3 | |
| 76 364 | 1.5 | 2804.2 | 208 | 2774 | 2197 | 270 | 1000K | 3 | |
| 77 5 | 1.7 | 2803.7 | 249 | 2768 | 2109 | 321 | 1000K | 4 | |
| 77 12 | 1.9 | 2803.2 | 282 | 2763 | 2041 | 364 | 1000K | 4 | |
| 77 19 | 2.2 | 2802.7 | 317 | 2757 | 1962 | 418 | 1000K | 4 | |
| 77 24 | 2.3 | 2802.4 | 339 | 2755 | 1923 | 446 | 1000K | 5 | |
| 77 24 | 2.3 | 2802.8 | 337 | 2757 | 1919 | 450 | 1000K | 5 | |
| 77 26 | 2.4 | 2802.3 | 353 | 2753 | 1887 | 473 | 1000K | 5 | |
| 77 33 | 2.6 | 2801.8 | 379 | 2749 | 1840 | 510 | 1000K | 5 | |
| 77 40 | 2.9 | 2801.4 | 410 | 2746 | 1788 | 553 | 1000K | 6 | |
| 77 47 | 3.1 | 2801.2 | 433 | 2743 | 1752 | 584 | 1000K | 6 | |
| 77 54 | 3.3 | 2800.8 | 448 | 2741 | 1716 | 617 | 1000K | 7 | |
| 77 61 | 3.6 | 2800.7 | 476 | 2738 | 1679 | 653 | 1000K | 7 | |
| 77 68 | 3.8 | 2800.3 | 512 | 2734 | 1629 | 702 | 1000K | 8 | |
| 77 73 | 4.0 | 2800.3 | 526 | 2732 | 1602 | 731 | 1000K | 8 | |
| 77 73 | 4.0 | 2800.3 | 527 | 2733 | 1602 | 731 | 1000K | 8 | |
| 77 82 | 4.2 | 2799.9 | 557 | 2729 | 1564 | 772 | 1000K | 9 | |
| 77 103 | 4.9 | 2795.7 | 568 | 2724 | 1509 | 836 | 1000K | 10 | |
| 77 145 | 6.3 | 2797.8 | 738 | 2709 | 1354 | 1044 | 1000K | 13 | |
| 77 257 | 10.0 | 2795.4 | 1152 | 2673 | 1070 | 1579 | 1000K | 20 | |
| 77 313 | 11.8 | 2794.9 | 1341 | 2657 | 971 | 1841 | 1000K | 24 | |
| 77 361 | 13.4 | 2794.2 | 1551 | 2639 | 884 | 2118 | 1000K | 27 | |
| 78 3 | 13.7 | 2793.9 | 1587 | 2636 | 867 | 2180 | 1000K | 28 | |
| 78 30 | 14.5 | 2793.5 | 1693 | 2629 | 833 | 2305 | 1000K | 30 | |
| 78 60 | 15.5 | 2793.3 | 1786 | 2623 | 809 | 2405 | 1000K | 32 | |
| CHANGE/MONTH | | −0.4 | 122 | −9 | −44 | 155 | | | ON LAST 5 GOOD POINTS. AT 1000K LOAD |

TABLE B

| DATE YR DAY | ELAPSED TIME (mos.) UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 76 335 | 0.0 | 2807.8 | 17860 | 1945 | 136 | 18742 | 9999K | 0 | −170 Mesh P2VP, −200 |
| 76 336 | 0.0 | 2742.7 | 12250 | 2109 | 200 | 12242 | 1000K | 0 | Mesh I$_2$ |
| 76 338 | 0.1 | 2748.2 | 8176 | 2261 | 294 | 7968 | 1000K | 0 | Sieve Size |
| 76 339 | 0.1 | 2490.5 | 88030 | 1 | 1 | 1042 | 1000K | 0 | BAD DATA POINT |
| 76 341 | 0.2 | 2751.7 | 6364 | 2339 | 371 | 6117 | 1000K | 0 | |
| 76 343 | 0.2 | 2754.3 | 5603 | 2373 | 414 | 5368 | 1000K | 0 | |
| 76 348 | 0.4 | 2758.2 | 4344 | 2432 | 518 | 4097 | 1000K | 1 | |
| 76 350 | 0.5 | 2757.5 | 4072 | 2444 | 546 | 3830 | 1000K | 1 | |
| 76 357 | 0.7 | 2758.4 | 3187 | 2487 | 665 | 2969 | 1000K | 1 | |
| 76 364 | 0.9 | 2761.2 | 2518 | 2525 | 796 | 2326 | 1000K | 2 | |
| 77 5 | 1.1 | 2763.0 | 2167 | 2545 | 885 | 1993 | 1000K | 2 | |
| 77 12 | 1.4 | 2766.3 | 1701 | 2570 | 1006 | 1641 | 1000K | 3 | |
| 77 19 | 1.6 | 2767.7 | 1662 | 2578 | 1059 | 1511 | 1000K | 3 | |
| 77 26 | 1.8 | 2769.4 | 1424 | 2596 | 1167 | 1284 | 1000K | 4 | |
| 77 33 | 2.0 | 2770.0 | 1299 | 2603 | 1225 | 1176 | 1000K | 4 | |
| 77 40 | 2.3 | 2771.7 | 1121 | 2616 | 1328 | 1012 | 1000K | 5 | |
| 77 47 | 2.5 | 2772.7 | 992 | 2626 | 1439 | 858 | 1000K | 5 | |
| 77 54 | 2.7 | 2773.8 | 854 | 2636 | 1501 | 784 | 1000K | 6 | |
| 77 61 | 3.0 | 2774.5 | 756 | 2643 | 1586 | 691 | 1000K | 6 | |
| 77 68 | 3.2 | 2775.5 | 658 | 2652 | 1656 | 622 | 1000K | 6 | |
| 77 75 | 3.4 | 2776.3 | 506 | 2658 | 1710 | 573 | 1000K | 7 | |
| 77 82 | 3.7 | 2777.2 | 525 | 2663 | 1764 | 526 | 1000K | 7 | |
| 77 89 | 3.9 | 2778.0 | 466 | 2670 | 1816 | 485 | 1000K | 8 | |
| 77 96 | 4.1 | 2778.8 | 422 | 2676 | 1859 | 453 | 1000K | 8 | |
| 77 103 | 4.3 | 2779.5 | 335 | 2681 | 1898 | 425 | 1000K | 9 | |
| 77 110 | 4.6 | 2780.2 | 355 | 2686 | 1929 | 404 | 1000K | 9 | |
| 77 117 | 4.8 | 2780.8 | 327 | 2691 | 1950 | 391 | 1000K | 10 | |

TABLE B-continued

| DATE YR DAY | ELAPSED TIME (mos.) UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 77 145 | 5.7 | 2782.3 | 255 | 2707 | 2031 | 342 | 1000K | 12 | |
| 77 257 | 9.4 | 2785.2 | 220 | 2730 | 2082 | 320 | 1000K | 19 | |
| 77 313 | 11.2 | 2783.8 | 266 | 2729 | 1988 | 383 | 1000K | 23 | |
| CHANGE /MONTH | | 0.6 | −12 | 6 | 10 | −3 | | | ON LAST 5 GOOD POINTS AT 1000K LOAD |

As can be seen from the table, prior art battery (A) was discharged on a 1000K ohm load an an initial impedance of 25–50 ohm which is typical. As the discharge proceeded, the internal impedance increased due to the build-up of the electrolyte layer. As a result of that increase, the voltage of the cell slowly decreased. After approximately 2.6 months the voltage decay rate was 2.1 milli-volts/month and the impedance had increased by 134 ohms/mon.

The battery (B) using the depolarizer pellet of the present invention had an initial impedance of 17,860 ohms. This impedance decreased by 50–60% the first week and continued to decrease thereafter, but at a much slower rate. As this decrease continued, the voltage under load delivered by the battery increased. In other tests impedances after 5 months at 37° C. were approximately 300 to 400 ohms.

Tables C, D (same batter as B), E and F show cells made in accordance with the present invention in which the impedance decreased when under 1000K ohm load.

TABLE C

| DATE YR DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 76 335 | 0.0 | 2807.0 | 30130 | 1480 | 73 | 12355 | 9999K | 0 | 170 P2VP, −200 I$_2$ |
| 76 336 | 0.0 | 2598.7 | 20260 | 1766 | 129 | 17809 | 1000K | 0 | |
| 76 338 | 0.1 | 2640.5 | 12660 | 2014 | 220 | 10077 | 1000K | 0 | |
| 76 339 | 0.1 | 2648.3 | 60170 | 2030 | 213 | 10639 | 1000K | 0 | |
| 76 341 | 0.2 | 2657.7 | 9984 | 2117 | 282 | 7704 | 1000K | 0 | BAD Z DATA POINT |
| 76 343 | 0.2 | 2664.2 | 8772 | 2159 | 317 | 6763 | 1000K | 0 | |
| 76 348 | 0.4 | 2677.2 | 7031 | 2240 | 418 | 4905 | 1000K | 1 | |
| 76 350 | 0.5 | 2677.5 | 6605 | 2252 | 437 | 4647 | 1000K | 1 | |
| 76 357 | 0.7 | 2684.2 | 5362 | 2305 | 546 | 3527 | 1000K | 1 | |
| 76 364 | 0.9 | 2692.5 | 4094 | 2349 | 661 | 2759 | 1000K | 2 | |
| 77 5 | 1.1 | 2698.3 | 3790 | 2376 | 748 | 2331 | 1000K | 2 | |
| 77 12 | 1.4 | 2706.7 | 3246 | 2407 | 855 | 1926 | 1000K | 3 | |
| 77 19 | 1.6 | 2710.8 | 2053 | 2427 | 946 | 1654 | 1000K | 3 | |
| 77 26 | 1.8 | 2716.8 | 2512 | 2448 | 1041 | 1421 | 1000K | 4 | |
| 77 33 | 2.0 | 2719.7 | 2286 | 2461 | 1108 | 1279 | 1000K | 4 | |
| 77 40 | 2.3 | 2725.7 | 1990 | 2480 | 1216 | 1085 | 1000K | 4 | |
| 77 47 | 2.5 | 2730.2 | 1757 | 2497 | 1311 | 941 | 1000K | 5 | |
| 77 54 | 2.7 | 2735.2 | 1530 | 2513 | 1408 | 815 | 1000K | 5 | |
| 77 61 | 3.0 | 2739.2 | 1345 | 2526 | 1490 | 720 | 1000K | 6 | |
| 77 68 | 3.2 | 2744.2 | 1160 | 2541 | 1580 | 629 | 1000K | 6 | |
| 77 75 | 3.4 | 2748.0 | 1010 | 2554 | 1649 | 566 | 1000K | 7 | |
| 77 82 | 3.7 | 2752.4 | 056 | 2566 | 1717 | 510 | 1000K | 7 | |
| 77 89 | 3.9 | 2756.3 | 740 | 2578 | 1784 | 459 | 1000K | 8 | |
| 77 96 | 4.1 | 2759.7 | 646 | 2589 | 1835 | 423 | 1000K | 8 | |
| 77 103 | 4.3 | 2762.5 | 561 | 2600 | 1882 | 393 | 1000K | 9 | |
| 77 110 | 4.6 | 2765.3 | 493 | 2610 | 1922 | 363 | 1000K | 9 | |
| 77 117 | 4.8 | 2767.8 | 435 | 2620 | 1958 | 347 | 1000K | 10 | |
| 77 145 | 5.7 | 2774.7 | 273 | 2654 | 2069 | 290 | 1000K | 11 | |
| 77 257 | 9.4 | 2781.5 | 157 | 2705 | 2164 | 256 | 1000K | 19 | |
| 77 313 | 11.2 | 2779.7 | 177 | 2708 | 2120 | 284 | 1000K | 23 | |
| Change/Month | | 2.1 | −43 | 14 | 29 | −11 | | | On Last 5 Good Points AT 1000K LOAD |

TABLE D

| DATE YR DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 76 335 | 0.0 | 2807.8 | 17860 | 1945 | 136 | 18742 | 9999K | 0 | −170 P2VP, −200 I$_2$ (STANDARD MIX) |
| 76 336 | 0.0 | 2742.7 | 12250 | 2109 | 200 | 12242 | 1000K | 0 | |
| 76 338 | 0.1 | 2748.2 | 8176 | 2261 | 294 | 7968 | 1000K | 0 | |
| 76 339 | 0.1 | 2490.5 | 88030 | 1 | 1 | 1042 | 1000K | 0 | BAD Z DATA POINT |
| 76 341 | 0.2 | 2751.7 | 6364 | 2339 | 371 | 6117 | 1000K | 0 | |
| 76 343 | 0.2 | 2754.4 | 5603 | 2373 | 414 | 5368 | 1000K | 0 | |
| 76 348 | 0.4 | 2758.2 | 4344 | 2432 | 518 | 4097 | 1000K | 1 | |
| 76 350 | 0.5 | 2757.5 | 4072 | 2444 | 546 | 3830 | 1000K | 1 | |
| 76 357 | 0.7 | 2758.4 | 3187 | 2487 | 665 | 2969 | 1000K | 1 | |
| 76 364 | 0.9 | 2761.2 | 2518 | 2525 | 796 | 2326 | 1000K | 2 | |
| 77 3 | 1.1 | 2763.0 | 2167 | 2545 | 885 | 1993 | 1000K | 2 | |
| 77 12 | 1.4 | 2766.3 | 1781 | 2570 | 1006 | 1641 | 1000K | 3 | |
| 77 19 | 1.6 | 2767.7 | 1662 | 2578 | 1059 | 1511 | 1000K | 3 | |

TABLE D-continued

| DATE YR DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 77 26 | 1.8 | 2769.4 | 1424 | 2596 | 1167 | 1284 | 1000K | 4 | |
| 77 33 | 2.0 | 2770.0 | 1299 | 2603 | 1225 | 1176 | 1000K | 4 | |
| 77 40 | 2.3 | 2771.7 | 1121 | 2616 | 1328 | 1012 | 1000K | 5 | |
| 77 47 | 2.5 | 2772.7 | 992 | 2626 | 1439 | 858 | 1000K | 5 | |
| 77 54 | 2.7 | 2773.8 | 854 | 2636 | 1501 | 784 | 1000K | 6 | |
| 77 61 | 3.0 | 2774.5 | 756 | 2643 | 1586 | 691 | 1000K | 6 | |
| 77 68 | 3.2 | 2775.5 | 658 | 2652 | 1656 | 622 | 1000K | 6 | |
| 77 75 | 3.4 | 2776.3 | 506 | 2658 | 1710 | 573 | 1000K | 7 | |
| 77 82 | 3.7 | 2777.2 | 525 | 2663 | 1764 | 526 | 1000K | 7 | |
| 77 89 | 3.9 | 2778.0 | 466 | 2670 | 1816 | 485 | 1000K | 8 | |
| 77 96 | 4.1 | 2778.8 | 422 | 2676 | 1859 | 453 | 1000K | 8 | |
| 77 103 | 4.3 | 2779.5 | 335 | 2681 | 1898 | 425 | 1000K | 9 | |
| 77 110 | 4.6 | 2780.2 | 355 | 2686 | 1929 | 404 | 1000K | 9 | |
| 77 117 | 4.8 | 2780.8 | 329 | 2691 | 1950 | 391 | 1000K | 10 | |
| 77 145 | 5.7 | 2782.3 | 255 | 2707 | 2031 | 342 | 1000K | 12 | |
| 77 257 | 9.4 | 2785.2 | 220 | 2730 | 2082 | 320 | 1000K | 19 | |
| 77 313 | 11.2 | 2783.8 | 266 | 2729 | 1988 | 383 | 1000K | 23 | |
| CHANGE/MONTH | | 0.6 | −12 | 6 | 10 | −3 | | | ON LAST 5 GOOD POINTS AT 1000K LOAD |

TABLE E

| DATE YR DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 76 335 | 0.0 | 2807.2 | 39720 | 1170 | 43 | 57700 | 9999K | 0 | −100 +170 P2VP, −200 I$_2$ |
| 76 336 | 0.0 | 2545.2 | 35240 | 1340 | 60 | 39728 | 1000K | 0 | |
| 76 338 | 0.1 | 2593.2 | 23560 | 1638 | 99 | 23681 | 1000K | 0 | |
| 76 339 | 0.1 | 2604.3 | 21540 | 1699 | 110 | 21237 | 1000K | 0 | |
| 76 341 | 0.2 | 2622.0 | 17980 | 1816 | 137 | 16882 | 1000K | 0 | |
| 76 343 | 0.2 | 2634.7 | 15840 | 1894 | 161 | 14261 | 1000K | 0 | |
| 76 348 | 0.4 | 2658.2 | 11590 | 2042 | 225 | 9962 | 1000K | 1 | |
| 76 350 | 0.5 | 2662.7 | 10610 | 2073 | 243 | 9177 | 1000K | 1 | |
| 76 357 | 0.7 | 2677.4 | 8291 | 2165 | 313 | 6919 | 1000K | 1 | |
| 76 364 | 0.9 | 2690.2 | 6620 | 2237 | 388 | 5419 | 1000K | 2 | |
| 77 5 | 1.1 | 2695.4 | 5660 | 2274 | 440 | 4667 | 1000K | 2 | |
| 77 12 | 1.4 | 2701.9 | 4077 | 2312 | 503 | 3974 | 1000K | 3 | |
| 77 19 | 1.6 | 2704.7 | 4384 | 2332 | 544 | 3607 | 1000K | 3 | |
| 77 26 | 1.8 | 2708.3 | 3870 | 2358 | 605 | 3152 | 1000K | 4 | |
| 77 33 | 2.0 | 2707.9 | 3644 | 2366 | 634 | 2959 | 1000K | 4 | |
| 77 40 | 2.3 | 2712.4 | 3231 | 2388 | 697 | 2611 | 1000K | 4 | |
| 77 47 | 2.5 | 2715.5 | 2940 | 2406 | 755 | 2342 | 1000K | 5 | |
| 77 54 | | 2719.2 | 2662 | 2422 | 812 | 2112 | 1000K | 5 | |
| 77 61 | 3.0 | 2722.2 | 2427 | 2436 | 868 | 1918 | 1000K | 6 | |
| 77 68 | 3.2 | 2725.4 | 2218 | 2450 | 928 | 1734 | 1000K | 6 | |
| 77 75 | 3.4 | 2727.9 | 2036 | 2461 | 981 | 1591 | 1000K | 7 | |
| 77 82 | 3.7 | 2730.8 | 1866 | 2473 | 1036 | 1459 | 1000K | 7 | |
| 77 89 | 3.9 | 2734.3 | 1697 | 2486 | 1105 | 1311 | 1000K | 8 | |
| 77 96 | | 2736.3 | 1566 | 2495 | 1157 | 1209 | 1000K | 8 | |
| 77 103 | 4.3 | 2738.5 | 1448 | 2504 | 1213 | 1111 | 1000K | 9 | |
| 77 110 | 4.6 | 2740.7 | 1345 | 2512 | 1262 | 1033 | 1000K | 9 | |
| 77 117 | 4.8 | 2742.7 | 1261 | 2519 | 1307 | 966 | 1000K | 10 | |
| 77 145 | 5.7 | 2751.8 | 928 | 2547 | 1491 | 734 | 1000K | 11 | |
| 77 257 | 9.4 | 2764.3 | 495 | 2589 | 1759 | 487 | 1000K | 19 | |
| 77 313 | 11.2 | 2764.9 | 433 | 2597 | 1853 | 414 | 1000K | 22 | |
| CHANGE/MONTH | | 3.7 | −134 | 12 | 85 | −87 | | | ON LAST 5 GOOD POINTS AT 1000K LOAD |

TABLE F

| DATE | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 76 335 | 0.0 | 2810.5 | 36730 | 1301 | 54 | 44085 | 9999K | 0 | −100 +170 P2VP, −200 I$_2$ |
| 76 336 | 0.0 | 2548.8 | 20590 | 1503 | 80 | 29130 | 1000K | 0 | |
| 76 338 | 0.1 | 2586.9 | 20260 | 1728 | 120 | 19273 | 1000K | 0 | |
| 76 339 | 0.1 | 2595.3 | 18750 | 1774 | 129 | 17826 | 1000K | 0 | |
| 76 341 | 0.2 | 2607.7 | 16410 | 1855 | 151 | 15154 | 1000K | 0 | |
| 76 343 | 0.2 | 2616.9 | 14870 | 1910 | 169 | 13526 | 1000K | 0 | |
| 76 348 | 0.4 | 2637.2 | 11670 | 2029 | 225 | 9891 | 1000K | 1 | |
| 76 350 | 0.5 | 2640.8 | 10980 | 2051 | 235 | 9476 | 1000K | 1 | |
| 76 357 | 0.7 | 2654.7 | 9014 | 2129 | 289 | 7525 | 1000K | 1 | |
| 76 364 | 0.9 | 2666.9 | 7468 | 2194 | 347 | 6130 | 1000K | 2 | |
| 77 5 | 1.1 | 2672.3 | 6559 | 2228 | 390 | 5356 | 1000K | 2 | |
| 77 12 | 1.4 | 2679.5 | 5748 | 2266 | 443 | 4608 | 1000K | 3 | |
| 77 19 | 1.6 | 2683.5 | 5203 | 2290 | 481 | 4170 | 1000K | 3 | |
| 77 26 | 1.8 | 2687.9 | 4678 | 2315 | 529 | 3709 | 1000K | 4 | |

TABLE F-continued

| DATE | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|
| 77 | 33 | 2.0 | 2689.2 | 4435 | 2325 | 551 | 3528 | 1000K | 4 | |
| 77 | 40 | 2.3 | 2694.4 | 3788 | 2348 | 602 | 3157 | 1000K | 4 | |
| 77 | 47 | 2.5 | 2698.7 | 3661 | 2367 | 650 | 2854 | 1000K | 5 | |
| 77 | 54 | 2.7 | 2702.7 | 3353 | 2303 | 697 | 2603 | 1000K | 5 | |
| 77 | 61 | 3.0 | 2706.2 | 3093 | 2398 | 744 | 2381 | 1000K | 6 | |
| 77 | 68 | 3.2 | 2709.8 | 2853 | 2413 | 795 | 2171 | 1000K | 6 | |
| 77 | 75 | 3.4 | 2712.7 | 2656 | 2424 | 838 | 2012 | 1000K | 7 | |
| 77 | 82 | 3.7 | 2716.9 | 2427 | 2440 | 898 | 1819 | 1000K | 7 | |
| 77 | 89 | 3.9 | 2720.7 | 2233 | 2452 | 959 | 1644 | 1000K | 8 | |
| 77 | 96 | 4.1 | 2723.0 | 2089 | 2461 | 995 | 1552 | 1000K | 8 | |
| 77 | 103 | 4.3 | 2725.7 | 1949 | 2471 | 1043 | 1439 | 1000K | 9 | |
| 77 | 110 | 4.6 | 2728.4 | 1823 | 2480 | 1095 | 1327 | 1000K | 9 | |
| 77 | 117 | 4.8 | 2731.0 | 1713 | 2488 | 1190 | 1140 | 1000K | 9 | |
| 77 | 145 | 5.7 | 2742.7 | 1266 | 2525 | 1358 | 893 | 1000K | 11 | |
| 77 | 257 | 9.4 | 2772.3 | 493 | 2621 | 1826 | 449 | 1000K | 19 | |
| 77 | 313 | 11.2 | 2776.8 | 402 | 2645 | 1897 | 406 | 1000K | 22 | |
| CHANGE/MONTH | | | 7.5 | −215 | 24 | 119 | −129 | | | ON LAST 5 GOOD POINTS AT 1000K LOAD |

Tables G, H, and I show decreases in the impedance under no load and when later subjected to a 50K ohm load show that nearly full capacity (250 mahr) was reached at approximately 5.7 months.

TABLE G

| DATE YR | DATE DAY | ELAPSED MOS UNDER LOAD | VOLTS (MV) | Z (OHMS) | 50K (MV) | 1K (MV) | RDC (OHMS) | LOAD (OHMS) | MHR | COMMENTS |
|---|---|---|---|---|---|---|---|---|---|---|
| 77 | 13 | 0.0 | 2800.8 | 3639 | 2427 | 544 | 3802 | 9999K | 0 | STANDARD MIX, SCREEN 2 |
| 77 | 19 | 0.0 | 2800.7 | 2979 | 2462 | 636 | 3116 | 9999K | 0 | |
| 77 | 26 | 0.0 | 2792.8 | 1521 | 2552 | 1012 | 1604 | 9999K | 0 | |
| 77 | 33 | 0.0 | 2786.9 | 1109 | 2578 | 1211 | 1179 | 9999K | 0 | |
| 77 | 40 | 0.0 | 2780.5 | 830 | 2595 | 1393 | 897 | 9999K | 0 | |
| 77 | 47 | 0.0 | 2776.8 | 659 | 2607 | 1528 | 731 | 9999K | 0 | |
| 77 | 54 | 0.0 | 2775.7 | 556 | 2616 | 1627 | 628 | 9999K | 0 | |
| 77 | 61 | 0.0 | 2776.6 | 473 | 2625 | 1716 | 547 | 9999K | 0 | |
| 77 | 68 | 0.0 | 2777.7 | 411 | 2633 | 1792 | 404 | 9999K | 0 | |
| 77 | 75 | 0.0 | 2778.7 | 361 | 2640 | 1856 | 495 | 9999K | 0 | |
| 77 | 82 | 0.0 | 2779.3 | 326 | 2646 | 1906 | 400 | 9999K | 0 | |
| 77 | 84 | 0.0 | 2621.3 | 328 | 2660 | 1898 | 361 | 50K | 0 | |
| 7 | 87 | 0.1 | 2641.4 | 305 | 2581 | 1937 | 344 | 50K | 4 | |
| 77 | 89 | 0.2 | 2641.8 | 292 | 2582 | 1954 | 332 | 50K | 6 | 71st DAY AFTER MFR. |
| 77 | 96 | 0.4 | 2641.3 | 270 | 2583 | 1983 | 313 | 50K | 15 | |
| 77 | 103 | 0.6 | 2640.3 | 260 | 2582 | 1994 | 305 | 50K | 24 | |
| 77 | 110 | 0.9 | 2638.7 | 263 | 2580 | 1986 | 309 | 50K | 33 | |
| 77 | 117 | 1.1 | 2636.9 | 275 | 2578 | 1965 | 323 | 50K | 42 | |
| 77 | 145 | 2.0 | 2624.4 | 370 | 2561 | 1842 | 405 | 50K | 77 | |
| 77 | 257 | 5.7 | 2689.2 | 563 | 2619 | 1596 | 671 | 50K | 220 | |
| CHANGE/MONTH | | | −296.1 | 11207 | −290 | −243 | −114 | | | ON LAST 5 GOOD POINTS AT 50K LOAD |

TABLE H

| DATE YR | DATE DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|---|
| | | | | | | | | | | STANDARD MIX, SCREEN 2 |
| 77 | 19 | 0.0 | 2802.5 | 8916 | 2352 | 370 | 6130 | 9999K | 0 | |
| 77 | 26 | 0.0 | 2797.5 | 1963 | 2562 | 873 | 2057 | 9999K | 0 | |
| 77 | 33 | 0.0 | 2794.3 | 1419 | 2600 | 1073 | 1495 | 9999K | 0 | |
| 77 | 40 | 0.0 | 2790.7 | 1099 | 2624 | 1239 | 1160 | 9999K | 0 | |
| 77 | 47 | 0.0 | 2733.2 | 88100 | 4 | 3 | 651 | 9999K | 0 | |
| 77 | 54 | 0.0 | 2723.5 | 89740 | 5 | 3 | 550 | 9999K | 0 | BAD DATA POINTS |
| 77 | 61 | 0.0 | 2724.9 | 89950 | 5 | 3 | 468 | 9999K | 0 | |
| 77 | 68 | 0.0 | 2722.0 | 89950 | 5 | 4 | 333 | 9999K | 0 | |
| 77 | 75 | 0.0 | 2784.5 | 527 | 2671 | 1689 | 601 | 9999K | 0 | |
| 77 | 82 | 0.0 | 2783.7 | 481 | 2676 | 1745 | 550 | 9999K | 0 | |
| 77 | 84 | 0.0 | 2648.2 | 481 | 2586 | 1739 | 507 | 50K | 0 | |
| 77 | 87 | 0.1 | 2678.2 | 444 | 2617 | 1794 | 478 | 50K | 4 | |
| 77 | 89 | 0.2 | 2681.8 | 423 | 2622 | 1818 | 460 | 50K | 6 | |
| 77 | 96 | 0.4 | 2685.5 | 339 | 2627 | 1838 | 430 | 50K | 15 | |
| 77 | 103 | 0.6 | 2686.5 | 383 | 2628 | 1857 | 431 | 50K | 24 | |
| 77 | 110 | 0.9 | 2685.7 | 416 | 2625 | 1798 | 479 | 50K | 33 | |
| 77 | 117 | 1.1 | 2684.2 | 465 | 2621 | 1724 | 542 | 50K | 42 | |
| 77 | 145 | 2.0 | 2679.2 | 572 | 2609 | 1573 | 691 | 50K | 79 | |

TABLE H-continued

| DATE YR | DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|---|
| 77 | 257 | 5.7 | 2653.7 | 1267 | 2560 | 1070 | 1508 | 50K | 222 | |
| CHANGE /MONTH | | | −225.0 | 4060 | −251 | −233 | 5236 | | | ON LAST 5 GOOD POINTS at 50K LOAD |

TABLE I

| DATE YR | DAY | ELAPSED MOS. UNDER LOAD | VOLTS (MV) | Z (OHMS) | 50K (MV) | 1K (MV) | RDC (OHMS) | LOAD (OHMS) | MAHR | COMMENTS |
|---|---|---|---|---|---|---|---|---|---|---|
| 77 | 13 | 0.0 | 2801.8 | 3281 | 2472 | 587 | 3511 | 9999K | 0 | STANDARD MIX, SCREEN 2 |
| 77 | 19 | 0.0 | 2800.7 | 2773 | 2497 | 665 | 2979 | 9999K | 0 | |
| 77 | 26 | 0.0 | 2791.9 | 1556 | 2571 | 987 | 1693 | 9999K | 0 | |
| 77 | 33 | 0.0 | 2785.7 | 1186 | 2593 | 1156 | 1801 | 9999K | 0 | |
| 77 | 40 | 0.0 | 2779.2 | 929 | 2609 | 1312 | 1030 | 9999K | 0 | |
| 77 | 47 | 0.0 | 2777.3 | 764 | 2621 | 1429 | 866 | 9999K | 0 | |
| 77 | 54 | 0.0 | 2777.9 | 658 | 2632 | 1518 | 759 | 9999K | 0 | |
| 77 | 61 | 0.0 | 2778.2 | 571 | 2641 | 1600 | 673 | 9999K | 0 | |
| 77 | 68 | 0.0 | 2779.7 | 507 | 2648 | 1668 | 607 | 9999K | 0 | |
| 77 | 75 | 0.0 | 2780.3 | 452 | 2654 | 1732 | 550 | 9999K | 0 | |
| 77 | 82 | 0.0 | 2780.9 | 410 | 2660 | 1784 | 506 | 9999K | 0 | |
| 77 | 84 | 0.0 | 2632.0 | 413 | 2567 | 1777 | 462 | 50K | 0 | |
| 77 | 87 | 0.1 | 2660.7 | 380 | 2597 | 1827 | 438 | 50K | 4 | |
| 77 | 89 | 0.2 | 2661.9 | 364 | 2599 | 1844 | 424 | 50K | 6 | 71st DAY AFTER MFR. |
| 77 | 96 | 0.4 | 2661.0 | 345 | 2598 | 1866 | 407 | 50K | 15 | |
| 77 | 103 | 0.6 | 2659.2 | 351 | 2595 | 1854 | 415 | 50K | 24 | |
| 77 | 110 | 0.9 | 2655.7 | 386 | 2589 | 1798 | 458 | 50K | 33 | |
| 77 | 117 | 1.1 | 2651.7 | 442 | 2582 | 1719 | 523 | 50K | 42 | |
| 77 | 145 | 2.0 | 2629.8 | 644 | 2549 | 1506 | 727 | 50K | 78 | |
| 77 | 257 | 5.7 | 2688.9 | 1025 | 2611 | 1201 | 1258 | 50K | 221 | |
| CHANGE/MONTH | | | −147.3 | 2394 | −185 | −217 | 3180 | | | ON LAST 5 GOOD POINTS AT 50K LOAD |

The foregoing cell are to be compared to the cells shown in Tables A, J and K which utilize a plastic depolarizer. At 220 Mahr cells utilizing the pelletized depolarizer of the present invention exhibited a Z of 500–2000 ohms. The prior cells (plastic depolarizer) typically showed a Z of greater than 2,000 ohms. The only difference in the cells was the depolarizer.

TABLE J

| DATE YR | DAY | ELASPSED MOS. UNDER LOAD | VOLTS (MV) | Z (OHMS) | 50K (MV) | 1K (MV) | RDC (OHMS) | LOAD (OHMS) | MAHR |
|---|---|---|---|---|---|---|---|---|---|
| 76 | 317 | 0.0 | 2800.5 | 27 | 2801 | 2685 | 44 | 9999K | 0 |
| 76 | 318 | 0.0 | 2802.4 | 36 | 2796 | 2647 | 57 | 50K | 0 |
| 76 | 321 | 0.1 | 2797.5 | 98 | 2785 | 2470 | 131 | 50K | 4 |
| 76 | 322 | 0.1 | 2795.4 | 125 | 2781 | 2401 | 162 | 50K | 5 |
| 76 | 323 | 0.2 | 2793.9 | 144 | 2778 | 2357 | 104 | 50K | 7 |
| 76 | 324 | 0.2 | 2792.2 | 163 | 2775 | 2312 | 206 | 50K | 8 |
| 76 | 325 | 0.2 | 2790.0 | 185 | 2771 | 2262 | 231 | 50K | 9 |
| 76 | 329 | 0.4 | 2783.9 | 248 | 2759 | 2137 | 301 | 50K | 15 |
| 76 | 336 | 0.6 | 2772.2 | 362 | 2737 | 1932 | 432 | 50K | 24 |
| 76 | 343 | 0.8 | 2762.2 | 467 | 2718 | 1764 | 564 | 50K | 33 |
| 76 | 348 | 1.0 | 2755.7 | 549 | 2706 | 1662 | 658 | 50K | 40 |
| 76 | 350 | 1.1 | 2752.0 | 593 | 2699 | 1607 | 713 | 50K | 43 |
| 76 | 357 | 1.3 | 2744.7 | 689 | 2605 | 1501 | 831 | 50K | 52 |
| 76 | 364 | 1.5 | 2736.5 | 800 | 2670 | 1401 | 960 | 50K | 61 |
| 77 | 5 | 1.7 | 2728.5 | 912 | 2655 | 1303 | 1105 | 50K | 69 |
| 77 | 12 | 1.9 | 2722.7 | 1001 | 2644 | 1238 | 1215 | 50K | 78 |
| 77 | 19 | 2.2 | 2715.0 | 1118 | 2629 | 1160 | 1362 | 50K | 88 |
| 77 | 24 | 2.3 | 2712.8 | 1164 | 2626 | 1138 | 1408 | 50K | 94 |
| 77 | 24 | 2.3 | 2713.2 | 1159 | 2626 | 1137 | 1412 | 50K | 94 |
| 77 | 26 | 2.4 | 2711.0 | 1189 | 2622 | 1120 | 1448 | 50K | 97 |
| 77 | 33 | 2.6 | 2706.5 | 1270 | 2613 | 1076 | 1547 | 50K | 106 |
| 77 | 40 | 2.9 | 2700.2 | 1344 | 2602 | 1031 | 1658 | 50K | 115 |
| 77 | 47 | 3.1 | 2696.8 | 1416 | 2595 | 1003 | 1733 | 50K | 124 |
| 77 | 54 | 3.3 | 2692.2 | 1488 | 2587 | 970 | 1825 | 50K | 133 |
| 77 | 61 | 3.6 | 2687.2 | 1561 | 2578 | 937 | 1923 | 50K | 142 |
| 77 | 68 | 3.8 | 2681.2 | 1652 | 2567 | 904 | 2031 | 50K | 151 |
| 77 | 73 | 4.0 | 2677.8 | 1708 | 2560 | 882 | 2107 | 50K | 157 |
| 77 | 73 | 4.0 | 2677.9 | 1712 | 2561 | 884 | 2097 | 50K | 160 |
| 77 | 82 | 4.2 | 2672.3 | 1792 | 2551 | 855 | 2201 | 50K | 169 |
| 77 | 103 | 4.89 | 2656.3 | 2019 | 2524 | 786 | 2479 | 50K | 196 |
| 77 | 145 | 6.3 | 2460.3 | 4282 | 2224 | 405 | 5602 | 50K | 247 |
| CHANGE/MONTH | | | −365.2 | 2779 | −340 | −89 | −567 | ON LAST 5 GOOD POINTS AT 50K LOAD | |

TABLE K

| DATE YR DAY | ELAPSED MOS. UNDER LOAD | VOLTS (MV) | Z (OHMS) | 50K (MV) | 1K (MV) | RDC (OHMS) | LOAD (OHMS) | MAHR |
|---|---|---|---|---|---|---|---|---|
| 76 317 | 0.0 | 2808.2 | 26 | 2803 | 2695 | 41 | 9999K | 0 |
| 76 318 | 0.0 | 2802.7 | 37 | 2797 | 2639 | 61 | 50K | 0 |
| 76 321 | 0.1 | 2797.5 | 99 | 2787 | 2479 | 127 | 50K | 4 |
| 76 322 | 0.1 | 2795.5 | 121 | 2783 | 2421 | 154 | 50K | 5 |
| 76 323 | 0.2 | 2793.9 | 137 | 2780 | 2383 | 171 | 50K | 7 |
| 76 324 | 0.2 | 2792.5 | 153 | 2777 | 2342 | 191 | 50K | 8 |
| 76 325 | 0.2 | 2790.7 | 172 | 2774 | 2297 | 214 | 50K | 9 |
| 76 329 | 0.4 | 2785.8 | 227 | 2765 | 2178 | 278 | 50K | 15 |
| 76 336 | 0.6 | 2778.2 | 324 | 2750 | 1992 | 395 | 50K | 24 |
| 76 343 | 0.8 | 2769.0 | 384 | 2737 | 1877 | 476 | 50K | 33 |
| 76 348 | 1.0 | 2762.7 | 414 | 2729 | 1821 | 520 | 50K | 40 |
| 76 350 | 1.1 | 2760.2 | 440 | 2725 | 1775 | 559 | 50K | 43 |
| 76 357 | 1.3 | 2759.2 | 519 | 2720 | 1681 | 647 | 50K | 52 |
| 76 364 | 1.5 | 2755.7 | 604 | 2712 | 1594 | 737 | 50K | 61 |
| 77 5 | 1.7 | 2751.5 | 687 | 2703 | 1512 | 831 | 50K | 70 |
| 77 12 | 1.9 | 2748.0 | 758 | 2676 | 1450 | 908 | 50K | 79 |
| 77 19 | 2.2 | 2743.2 | 848 | 2687 | 1379 | 1006 | 50K | 88 |
| 77 24 | 2.3 | 2740.9 | 891 | 2683 | 1352 | 1047 | 50K | 95 |
| 77 24 | 2.3 | 2740.8 | 882 | 2683 | 1355 | 1042 | 50K | 95 |
| 77 26 | 2.4 | 2739.3 | 912 | 2680 | 1336 | 1070 | 50K | 97 |
| 77 33 | 2.6 | 2735.4 | 985 | 2672 | 1285 | 1152 | 50K | 106 |
| 77 40 | 2.9 | 2730.0 | 1080 | 2662 | 1233 | 1242 | 50K | 116 |
| 77 47 | 3.1 | 2725.5 | 1159 | 2654 | 1192 | 1317 | 50K | 125 |
| 77 54 | 3.3 | 2719.5 | 1241 | 2644 | 1144 | 1413 | 50K | 134 |
| 77 61 | 3.6 | 2713.2 | 1341 | 2632 | 1089 | 1533 | 50K | 143 |
| 77 68 | 3.8 | 2704.8 | 1471 | 2617 | 1029 | 1681 | 50K | 152 |
| 77 73 | 4.0 | 2697.7 | 1576 | 2604 | 979 | 1818 | 50K | 159 |
| 77 75 | 4.0 | 2696.3 | 1595 | 2602 | 973 | 1833 | 50K | 161 |
| 77 82 | 4.2 | 2684.7 | 1741 | 2582 | 913 | 2017 | 50K | 170 |
| 77 103 | 4.9 | 2587.5 | 2943 | 2421 | 595 | 3584 | 50K | 197 |
| 77 145 | 6.3 | 2284.2 | 7259 | 1975 | 261 | 9172 | 50K | 246 |
| CHANGE/MONTH | | −3.2 | 2601 | −2 | 0 | −7471 | ON LAST 5 GOOD POINTS AT 50K LOAD | |

The ratio of iodine to P2VP or P2VQ may range widely from 3–30 to 1; however, a 3:1 ratio while having a desirable electrical properties is at the lowest practical capacity. A ratio of 30:1, on the other hand, approaches the upper limit with respect to internal impedance. A ratio of 15:1 is satisfactory, except that where such cells have been heated they have increased self-discharge which renders them useful for high current drain applications which require less than 10 year shelf lives. Where shelf lives are important as well as mild heating, higher ratios of iodine are preferred, for example, 18:1 to 22:1.

In such cells for use in electric watch applications, a self-discharge in terms of heat output of 10 μwatts has been established. A ratio of 20:1 decayed to 10 μwatts in 29 days, whereas it took a cell having a 15:1 ratio approximately 2,000 days. (Both cells were heated for 15 hrs. at 80° C.). A cell having 26:1 depolarizer had an initial self-discharge of 14 μwatts, but the impedance provided was sufficiently high to render a cell of only average electrical properties. Interestingly, cells with a plastic depolarizer and a ratio of 15:1 have low heat output, for example 5 μwatts at 60 days. The low heat output of the cells made with plastic depolarizers continues throughout the life of the cell since the internal impedance increases.

Accordingly, for long life pelletized cells, it is preferred to utilize a ratio of about 20:1 iodine to polymer. The pelletized depolarizer of the present invention provides multiyear batteries suitable for use in watches. While presently preferred embodiments of the invention have been described in particularity, the invention may be otherwise embodied within the scope of the appended claims.

What is claimed is:

1. A depolarizer for use in lithium primary cells comprising a pelletized particulate mixture of iodine, an organic polymer consisting of either poly-2-vinylpyridine or poly-2-vinylquinoline having a weight average molecular weight of greater than about $1 \times 10^3$ and a charge transfer complex consisting of said selected polymer and iodine wherein the iodine is present in an amount of from about 3 to 30 parts for each part of total organic.

2. A depolarizer as set forth in claim 1 wherein the particulate polymer is less than −100 mesh in size and the particulate iodine is less than −70 mesh in size.

3. A depolarizer as set forth in claim 1 wherein the iodine is present in an amount of from 15 to 26 parts per part of total organic.

4. A depolarizer as set forth in claim 3 wherein the particulate polymer is equal to or less than −170 mesh in size and the particulate iodine is equal to or less than −100 mesh in size.

5. A method for making a pelletized depolarizer comprising the steps of:
   a. mixing one part of an organic polymer consisting of poly-2-vinylpyridine or poly-2-vinylquinoline having a weight average molecular weight of greater than about $1 \times 10^3$ and a particle size of less than −100 mesh with from 3 to 30 parts of iodine having a particle size of less than −70 mesh;
   b. pelletizing said mixture by placing it in a die of the desired configuration and subjecting it to a pressure of from 5,000 to 15,000 psi.

6. A battery comprising an outer case having an opening therethrough, at least one lithium anode member in contact with said case and a pelletized particulate depolarizer in contact with said anode and consisting of an organic polymer of either poly-2-vinylpyridine or poly-2-vinylquinoline, a charge transfer complex of said selected polymer and iodine where the iodine in said depolarizer is present in an amount of from 3 to 30 parts for each part of total organic present, said depolarizer pellet being electrically isolated from said outer case and having a lead member electrically connected thereto, said lead member having an insulating coating thereover and extending from said depolarizer pellet through said opening in the outer case and hermetic seal means for hermetically sealing said outer case.

7. A battery comprising an outer case having an opening therethrough, at least one lithium anode member positioned within said case and insulated therefrom, an electrical lead extending from and in contact with said anode through said opening, a pelletized particulate depolarizer in contact with case and consisting of an organic polymer of either poly-2-vinylpyridine or poly-2-vinylquinoline, a charge transfer complex consisting of said selected polymer and iodine, where iodine is present in said depolarizer in an amount of from 3 to 30 parts for each part of total organic present, and means for hermetically sealing said outer case.

8. A battery as set forth in claim 6 wherein said iodine is present in the depolarizer in an amount of from 15 to 26 parts for each part of total organic present.

9. A battery as set forth in claim 7 wherein said iodine is present in the depolarizer in an amount of from 15 to 26 parts for each part of total organic present.

10. A battery as set forth in claim 7 wherein said outer case includes a second opening therethrough, said depolarizer pellet being electrically insulated from said outer case and a second electrical lead electrically connected to said pellet and extending through said second opening.

* * * * *

UNITED STATES PATENT AND TRADEMARK OFFICE
CERTIFICATE OF CORRECTION

PATENT NO. : 4,148,975
DATED : April 10, 1979
INVENTOR(S) : Alan A. Schneider, George C. Bowser, Lurman H. Foxwell and Marilyn J. Harney It is certified that error appears in the above-identified patent and that said Letters Patent are hereby corrected as shown below:

Page 1, Section [75] Inventors:, after "Lurman H. Foxwell, Baltimore" insert -- Marilyn J. Harney, Sparks --;
Column 1, line 21, after "P2VP+P2VP.", delete "$n_1+n_2I_2$" and substitute therefor -- $n_1I_2+n_2I_2$ --;
Column 1, line 23, after "Preferably", delete "$n_1n_2$" and substitute therefor -- $n_1+n_2$ --;
Column 1, line 54, after "/$\Sigma NiMi=$", delete "$\Sigma WiMi$" and substitute therefor -- $\Sigma NiMi$ --;
Column 2, line 47, delete "dimension" and substitute therefor -- dimensioned --;
Column 2, line 68, after "P2VP+P2VP.", delete "$n_1I_1+n_2I_2$" and substitute therefor -- $n_1I_2+n_2I_2$ --.

*Signed and Sealed this*

*Twenty-fourth* Day of *July 1979*

[SEAL]

*Attest:*

LUTRELLE F. PARKER

*Attesting Officer*    *Acting Commissioner of Patents and Trademarks*